(12) United States Patent
Boone

(10) Patent No.: US 11,516,970 B2
(45) Date of Patent: Dec. 6, 2022

(54) AGRICULTURAL SHREDDER

(71) Applicant: Raymond Boone, Siletz, OR (US)

(72) Inventor: Raymond Boone, Siletz, OR (US)

( * ) Notice: Subject to any disclaimer, the term of this patent is extended or adjusted under 35 U.S.C. 154(b) by 287 days.

(21) Appl. No.: 17/085,776

(22) Filed: Oct. 30, 2020

(65) Prior Publication Data

US 2021/0127591 A1    May 6, 2021

Related U.S. Application Data

(60) Provisional application No. 62/928,265, filed on Oct. 30, 2019.

(51) Int. Cl.
*B02C 13/04* (2006.01)
*A01G 3/00* (2006.01)
*B02C 13/28* (2006.01)

(52) U.S. Cl.
CPC .............. *A01G 3/002* (2013.01); *B02C 13/04* (2013.01); *B02C 2013/2816* (2013.01)

(58) Field of Classification Search
CPC ............ A01G 3/002; B02C 2013/2816; B02C 2013/28663; B02C 2013/04; B02C 2201/066
See application file for complete search history.

(56) References Cited

U.S. PATENT DOCUMENTS

| | | | | |
|---|---|---|---|---|
| 359,630 A * | 3/1887 | Pratt | ....................... | B02C 13/20 241/193 |
| 1,034,552 A * | 8/1912 | Williams | ................. | B02C 13/26 241/85 |
| 1,580,620 A * | 4/1926 | McKain | ................... | B02C 13/26 241/193 |
| 2,228,421 A * | 1/1941 | Taylor | .................... | B65D 88/68 15/104.14 |
| 2,525,023 A * | 10/1950 | Ensminger | .............. | B02C 13/00 280/43.1 |
| 2,882,667 A * | 4/1959 | Brady | ................... | B02C 13/288 56/29 |
| 2,996,259 A * | 8/1961 | Damron | ................ | B02C 13/284 241/189.1 |
| 3,015,188 A * | 1/1962 | Reinecker | ............. | A01F 29/005 47/9 |
| 3,037,713 A * | 6/1962 | Carroll | .................... | B02C 13/26 241/258 |
| 3,138,300 A * | 6/1964 | Rintala | .................. | B65D 88/68 414/324 |

(Continued)

*Primary Examiner* — Faye Francis
(74) *Attorney, Agent, or Firm* — Phillip M. Wagner

(57) ABSTRACT

A shredding rotor rotatably coupled to a support frame is configured to remove plant leaves from plant stems fed into an aperture in the support frame. The shredding rotor includes many flexible shredding strands attached to a rotor axle. The shredding strands are sufficiently flexible to strip leaves from all sides of the stems without breaking the stems into pieces. Shredding strands are spaced far enough apart from one another to prevent plant material from becoming lodged between the strands. A destemming and shredding apparatus including two shredding rotors separates an incoming stream of plant materials into an output stream of shredded leaves and another output stream of essentially intact stems. A shredding apparatus having no more than one shredding rotor receives destemmed leaves at an inlet aperture and outputs shredded leaf fragments.

17 Claims, 10 Drawing Sheets

(56) References Cited

U.S. PATENT DOCUMENTS

| | | | | | |
|---|---|---|---|---|---|
| 3,327,955 | A | * | 6/1967 | Tyler | B02C 13/28 |
| | | | | | 241/189.1 |
| 3,710,960 | A | * | 1/1973 | Stauffer | A01F 25/2018 |
| | | | | | 222/413 |
| 3,828,947 | A | * | 8/1974 | Lepley | B01F 27/0542 |
| | | | | | 414/324 |
| 3,837,507 | A | * | 9/1974 | Lepley | B65D 88/68 |
| | | | | | 414/324 |
| 3,993,256 | A | * | 11/1976 | Brewer | B02C 18/0084 |
| | | | | | 241/193 |
| 4,875,630 | A | * | 10/1989 | Carlson | A01G 3/002 |
| | | | | | 241/292.1 |
| 4,957,404 | A | * | 9/1990 | Lepley | B01F 27/0542 |
| | | | | | 222/240 |
| 5,184,781 | A | * | 2/1993 | Andela | B02C 13/20 |
| | | | | | 241/62 |
| 5,697,563 | A | * | 12/1997 | Fujimoto | B02C 13/28 |
| | | | | | 241/102 |
| 5,944,268 | A | * | 8/1999 | Andela | B02C 19/0087 |
| | | | | | 241/193 |
| 2013/0305969 | A1 | * | 11/2013 | Trebucchi | B02C 13/14 |
| | | | | | 241/191 |
| 2014/0077010 | A1 | * | 3/2014 | Watts | B02C 13/282 |
| | | | | | 241/55 |
| 2017/0100754 | A1 | * | 4/2017 | Nelson | B02C 13/2804 |
| 2022/0168747 | A1 | * | 6/2022 | Nemedi | B02C 13/30 |

* cited by examiner

Section A - A

Section C - C

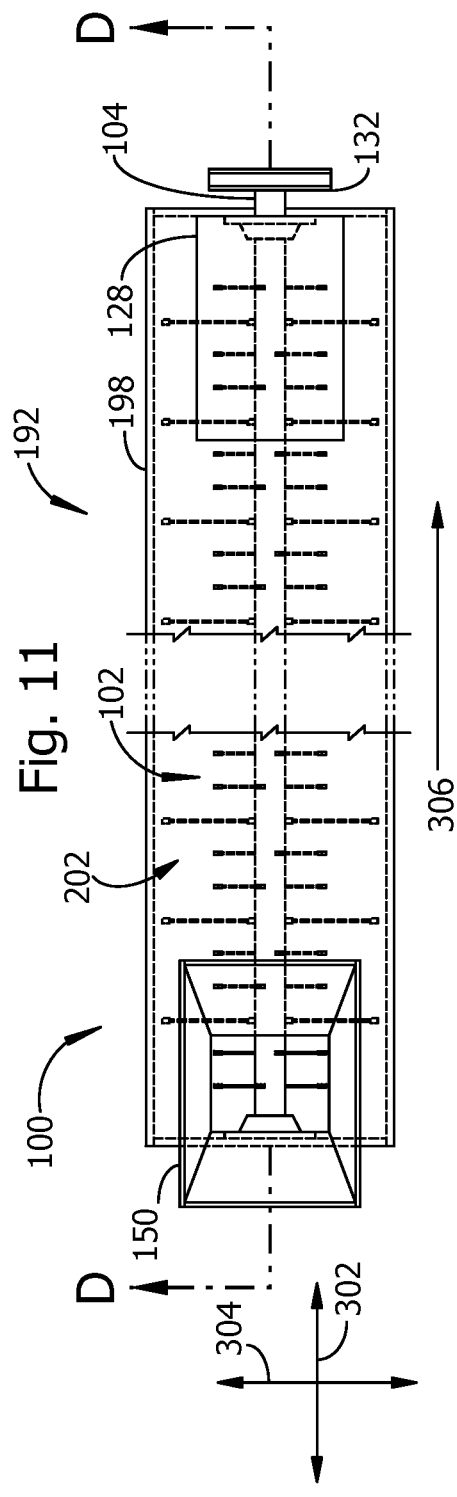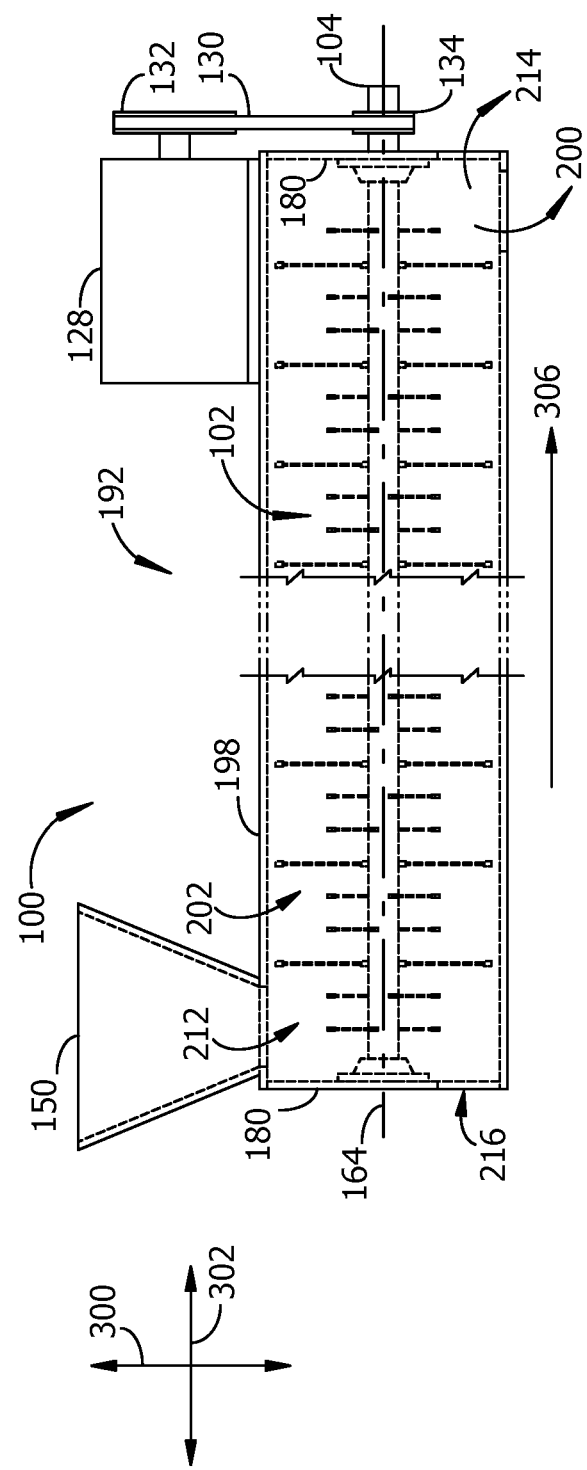

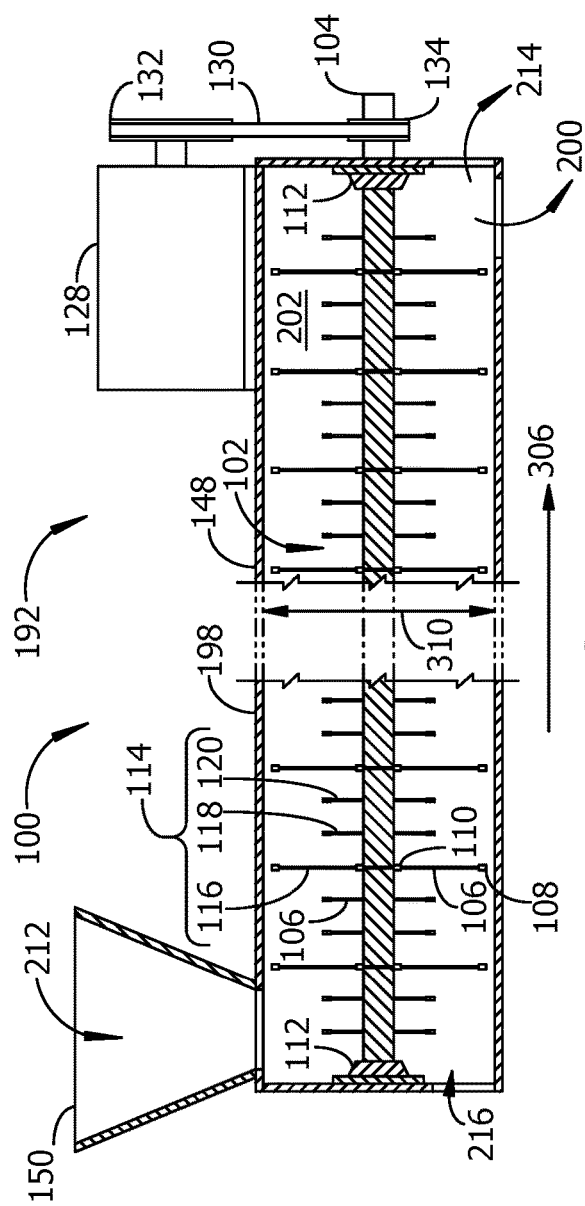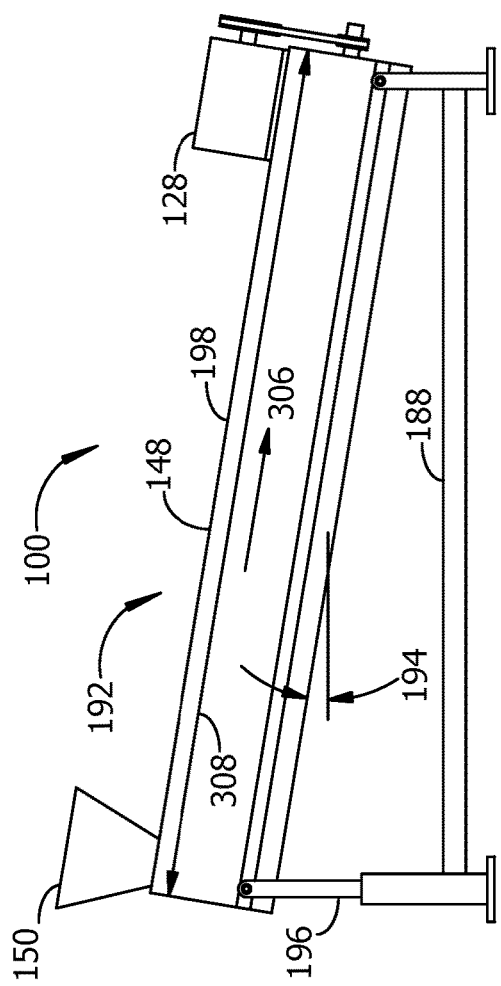

AGRICULTURAL SHREDDER

FIELD OF THE INVENTION

Embodiments are generally related to agricultural equipment for separating plant stems from leaves and for dividing leaves into pieces.

BACKGROUND

Industrial hemp is an annual broadleaf plant including non-psychoactive varieties of Cannabis sativa L. containing less than 0.3% tetrahydrocannabinol (THC). Hemp leaves may be arranged as a palmate cluster on a common petiole growing from a branching stem. Fiber, oil, and other components extracted from hemp leaves, branches, and stems may be used to make textiles, rope, building materials, biodegradable plastics, cosmetics, cannabidiol (CBD) and other health-related products, and many other items.

Industrial hemp may be grown commercially in densely-packed fields to encourage the growth of tall plants capable of producing long fibers. Commercial harvesters adapted for cutting and collecting the above-ground parts of the hemp plants are capable of harvesting thousands of plants per hour. For some products derived from industrial hemp, the stems and branches are the preferred source material. For other products, the leaves, flowers, and/or seeds may be the preferred source material. For example, a processed plant material having a high weight fraction of leaves and a low weight fraction of stems and branches may be preferred as a source material for CBD extraction. Conversely, a processed plant material comprising a high weight fraction of essentially intact stems and branches and a low weight fraction of leaves may be preferred as a raw material for fiber extraction. Increasing the ratio of a preferred plant component to the other plant components may result in a processed plant material with higher market value, less low-yield or unusable waste material in subsequent manufacturing steps, and higher quality for the finished goods made from the plant product.

Whichever part of the plant is preferred as a source material for subsequent product manufacturing operations, separating leaves and stems has been a labor-intensive, time-consuming process that can be a bottleneck in overall production rates for converting harvested plants into commercial quantities of separated plant components. Some devices for separating stems and branches from leaves and flowers require a harvested plant to be pushed through an aperture in a plate, preferably cut end of the stem first. The aperture may be large enough to admit the stem but not most leaves and branches. Intact harvested plants may be manually fed into the aperture in small batches by a person who must select the correct aperture size in the plate for the size of the material being processed. Leaves and small branches projecting out from the main stem are broken off against the plate as the stem passes through the aperture. Material broken off the stems by the plate forms the processed plant material output from the device. Leaves close to the stem may not be separated when passing through the aperture, and stems with large branches may require manual pre-trimming or multiple passes to separate leaves and stems. Material that does not pass through the aperture may include branches or pieces of branches which reduce the weight fraction of leaves in the processed plant material, possibly requiring additional labor to separate the unwanted material or reducing the economic value of the processed plant material.

Other machinery draws harvested plants through one or more cylindrical roller brushes, each brush including many densely-packed, stiff strands or bristles extending radially outward from a cylindrical hub. Bringing a plant into contact with the rotating bristles on the brush causes leaves to be pulled from the stems and branches. However, bristles made from stiff wire strands may cut stems and branches into pieces that are mixed into the output stream for separated leaves, adding possibly unwanted material to the output stream and reducing the weight fraction of leaves in the output stream. Brushes made from other materials may not cut the stems and branches, but the closely-spaced bristles in a roller brush may become fouled with small stem or leaf fragments or become coated with resins or sap. Roller brushes with closely-spaced bristles may require frequent cleaning and/or relatively slow feed rates to achieve an economically attractive fraction of the preferred plant component in the processed plant material output.

SUMMARY

An example apparatus embodiment includes a support frame and a shredding rotor rotatably coupled to the support frame. An example shredding rotor includes a rotor axle rotatably coupled to the support frame. The rotor axle has a rotor axle axis of rotation parallel to a longest dimension of the rotor axle. The rotor axle is formed with many strand through-holes passing all the way through the rotor axle from oner side of the rotor axle to an opposite side of the rotor axle. The example shredding rotor further includes a shredding strand having a strand first end and a strand second end opposite the first end, with the shredding strand formed as an elongate flexible line; a first shredding strand attached to the rotor axle with the first shredding strand passing through a first of the strand through-holes, a strand first end extending radially away from the first strand through-hole, and the strand second end extending radially away from the strand through-hole in a direction opposite to the strand first end. The example shredding rotor further includes a second of the shredding strand passing through a second of the strand through-holes adjacent the first strand through-hole, the second shredding strand separated from the first shredding strand by a selected linear separation distance and a selected angular separation. The example apparatus embodiment further includes a rotor motor attached to the support frame with the shredding rotor rotatably coupled to the rotor motor.

The example apparatus embodiment optionally includes a third of the shredding strand passing through a third of the strand through-holes adjacent the second strand through-hole, the third shredding strand separated from the second shredding strand by the selected linear separation distance and the selected angular separation.

The example apparatus embodiment optionally includes a shredding strand group including the first, second, and third shredding strands; and a plurality of the shredding strand group attached to the rotor axle with adjacent shredding strand groups separated from one another by the selected linear separation distance.

In some embodiments, the shredding rotor is a first shredding rotor and the apparatus further includes a second of the shredding rotor coupled to the support frame with an outer rotational perimeter of the shredding strands on the first shredding rotor overlapping an outer rotational perimeter of the shredding strands on the second shredding rotor. The second shredding rotor is optionally positioned with a selected linear offset distance between one of the shredding strands on the first shredding rotor and an opposing shredding strand on the second shredding rotor.

Some apparatus embodiments further include an inlet aperture formed in the support frame; a fixed feed roller assembly attached to the support frame between the inlet aperture and the first and second shredding rotors, with an axis of rotation of the fixed feed roller assembly approximately parallel to the rotor axle axis of rotation; and a floating feed roller assembly slidably engaged with the support frame between the inlet aperture and the first and second shredding rotors and adjacent the fixed feed roller assembly, with an axis of rotation of the floating feed roller assembly approximately parallel to the rotor axle axis of rotation.

BRIEF DESCRIPTION OF THE DRAWINGS

FIGS. 11-15 show another example apparatus embodiment having a shredding rotor coupled to a support frame configured as an axial-flow shredder, wherein:

FIG. 11 is a view toward the top side of an example axial flow shredder;

FIG. 12 is a side view of the example axial flow shredder of FIG. 11;

FIG. 13 is an end view of the example axial flow shredder of FIGS. 11-12;

FIG. 14 is a cross-sectional view D-D of the example axial flow shredder of FIGS. 11-13, with a location and viewing direction for the cross-sectional view marked by a section line D-D in FIG. 11; and FIG. 15 is a side view of the example axial flow shredder of FIGS. 11-14, showing the support frame attached to an example of a support stand adapted for changing a tilt angle of the axial flow shredder.

DESCRIPTION

Figure 1:
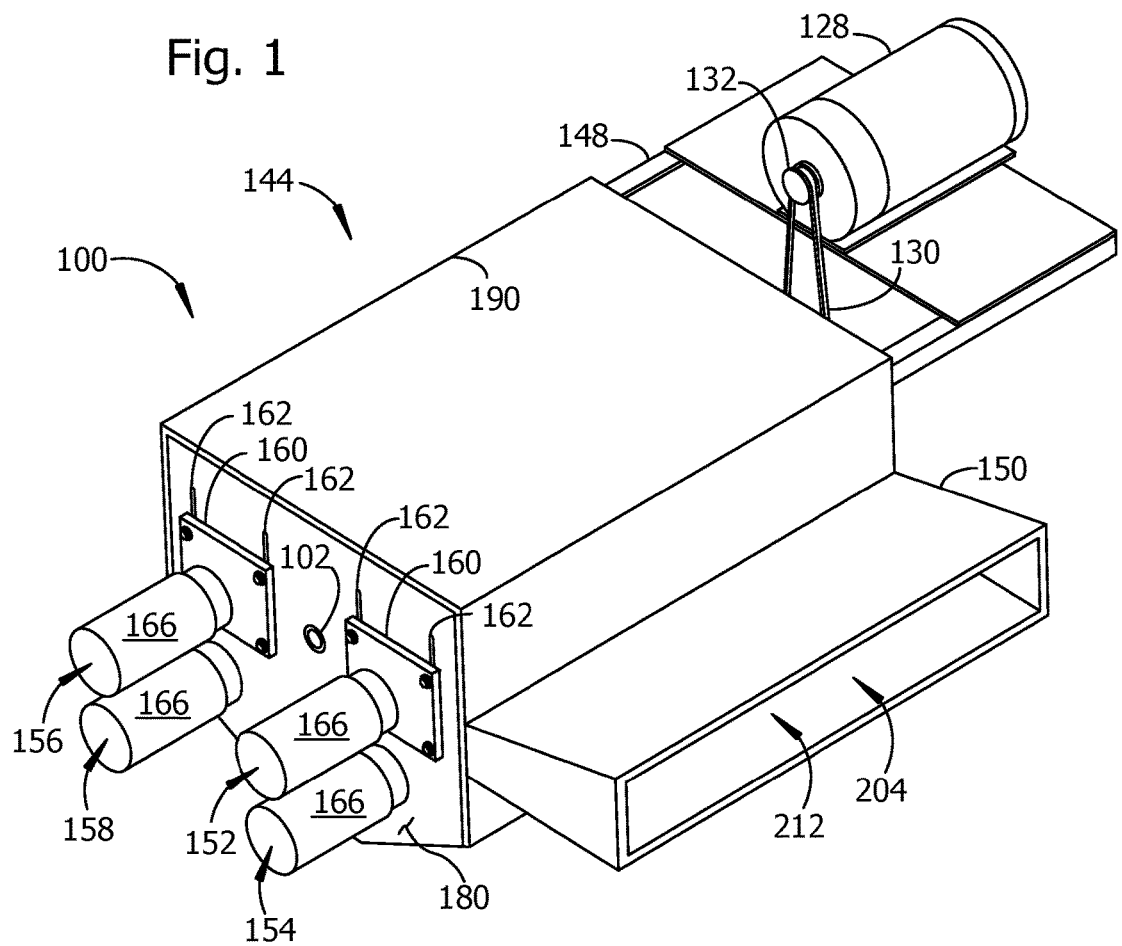
FIG. 1 is a pictorial view of an example apparatus embodiment configured as an agricultural destemmer and shredder including at least one shredding rotor.

Example apparatus embodiments include a shredding rotor having shredding strands extending radially outward from a central rotor axle configured for rotational attachment to a support frame. The shredding rotor may be operated for efficiently separating the stem and branches of a harvested plant from the plant's leaves, flowers, and seeds. Some embodiments place one or more shredding rotors in an enclosure to contain shredded material and protect nearby personnel from contact with moving parts. In some apparatus embodiments, plant material to be processed moves through a shredding chamber in a direction approximately perpendicular to the axis of rotation of the shredding rotor. In other apparatus embodiments, plant material to be processed moves through a shredding chamber in a direction approximately parallel to the axis of rotation of the shredding rotor.

Each of the shredding strands projecting outward from the rotor axle of a shredding rotor are preferably formed as elongate lines made from a resilient material sufficiently flexible to break or tear leaves from stems and branches and tear or shred leaves into smaller pieces without substantial cutting or breaking of the stems and branches. Substantial cutting or breaking of stems, branches, and/or shredding strands may occur when shredding strands have been formed from a material that is too small in diameter, too rigid, and/or insufficiently flexible to permit shredding strands to bend easily around small stems without substantial cracking or breakage of the strand material. Preferred materials for shredding strands therefore differ significantly in flexibility and/or wear properties from the natural and synthetic bristles used in many brooms and brushes. Jointed metal bars, chains, and other flail-like devices with rigid segments cause too much breakage of stems and branches for use on the disclosed embodiments of shredding rotors 102.

Apparatus embodiments are effective for dividing an input stream of harvested plants into two separate output streams, one output stream comprising stems and branches with few residual leaves, and the other output stream comprising leaves and possibly flowers or seeds but few pieces of stems and branches. Each output stream therefore has a high fraction by weight of a selected plant component and low fractions by weight of the other plant components.

Unlike previous machines which process plant materials in small batches by forcing the stems of plants through apertures in stripping plates, embodiments of a shredding rotor are well suited to continuous input of plant materials to be processed, for example by a conveyor or hopper, and continuous output of separated plant materials. Plant material to be processed may be brought into contact with the shredding rotor in an embodiment 100 cut-stem first or leaves first, unlike previously-known devices with stripping plates which preferably receive plants cut-stem-end first.

Embodiments of a shredding rotor have undergone extensive testing and have been found to be effective for separating stems and branches from leaves, flowers, and seeds of industrial hemp plants. Embodiments of the shredding rotor are advantageous for harvesting fiber from hemp because the shredding rotors are operable to strip leaves from stems without breaking stems, thereby producing stripped stems with long extractable fibers. Embodiments of a shredding rotor have also been found to be effective for separating pine nuts from pine cones, producing an output stream with a high fraction by weight of intact pine nuts and a low fraction of other parts of the pine cone, and another output stream made up of the central core and scales of the pine cones with few pine nuts. Apparatus embodiments are further effective for separating stems and branches from leaves, flowers, and seeds of species of cannabis other than Cannabis sativa L., for example, but not limited to, Cannabis indicia and Cannabis ruderalis. For some plants to be processed, the stem of the plant may be referred to as the stalk. Examples of a harvested plant suitable for processing with the disclosed embodiments include, but are not limited to, the above-ground parts of a plant severed from the roots, including stems, branches, leaves, flowers, seed pods, and seeds, and intact or nearly intact plants pulled from the ground, including the plant's roots and above-ground parts.

Directional references applied herein are marked in some figures by labeled arrows, for example a vertical direction by an arrow 300, a transverse or lateral direction by an arrow 304, and a longitudinal direction by an arrow 302. For the disclosed embodiments 100, the longitudinal direction 302 generally refers to a direction in which plant material to be processed moves from an inlet aperture toward an outlet aperture. The vertical, longitudinal, and transverse directions referenced herein are mutually orthogonal.

Turning to the figures, examples of apparatus embodiments 100 are shown in FIGS. 1-15. In FIG. 1, an example apparatus embodiment 100 configured as a destemmer and shredder 144 includes an enclosure having a support frame 148, a two end walls 180, and a removable support frame cover 190. The support frame 148, end walls 180, and support frame cover 190 define and enclose a destemming and shredding chamber 204 in the interior of the enclosure, protecting nearby persons from contact with moving parts and plant materials inside the destemming and shredding chamber. A feed chute 150 provides safe entry of plant materials to be processed into the destemming and shredding chamber 204 through an inlet aperture 212 formed in the support frame 148 and/or the support frame cover 190. At least one shredding rotor 102, an end of which is visible in FIG. 1, is rotationally coupled to the opposing side walls 180 with the shredding rotor extending across the destemming and shredding chamber 204. A rotor motor 128 attached to the support frame 148 drives the shredding rotor 102 in rotation by a flexible rotor belt 130 coupling a motor pulley 132 to a rotor pulley 134.

Opposing pairs of roller assemblies driven by roller motors 166 force plant material being processed through the destemming and shredding chamber 204. In the illustrated example embodiment 100 of FIG. 1, a separate roller motor 166 is provided for each roller assembly. The two roller motors 166 closest to the feed chute 150 turn a floating feed roller assembly 152 and a fixed feed roller assembly 154 positioned below the floating feed roller assembly in opposite directions to pull plant material entering the feed chute 150 into contact with the shredding rotors 102. Another pair of roller motors 166 turn a floating output roller assembly 156 and a fixed output roller assembly 158 positioned below the floating output roller assembly in opposite directions to push stems stripped of their leaves out of the destemming and shredding chamber 204 through an outlet aperture. The upper roller motor 166 in each pair of roller motors is coupled to a floating roller end plate 160 slidably engaged with the end wall 180 by fasteners passing through support frame slots 162 formed in the end walls 180, enabling the upper motor and the roller attached to it to "float", i.e. change a separation distance to the lower roller in response to a quantity and/or thickness of plant material passing through the destemming and shredding chamber 204. The floating feed roller assembly 152 moves upwards and away from the fixed feed roller assembly 154 when a large plant or plant stem is drawn through the rollers and moves downwards under the influence of the upper roller assembly's weight to maintain a firm grip on smaller plants.

The optional feed chute 150 in the example embodiment 100 is attached to the support frame 148 or alternately to the support frame cover 190 near the inlet aperture 212. The feed chute and inlet aperture are preferably sized to permit the passage of harvested plants into the destemming and shredding chamber but make it difficult for a person's hand to reach sufficiently far into the chamber to accidentally contact moving parts. The feed chute may be omitted in some embodiments, for example when a conveyor is used to load plants into the inlet aperture. The feed chute may alternately be replaced with a shelf or roller assembly to guide plants through the inlet aperture 212 and into contact with the floating and fixed feed roller assemblies.

Figure 2:
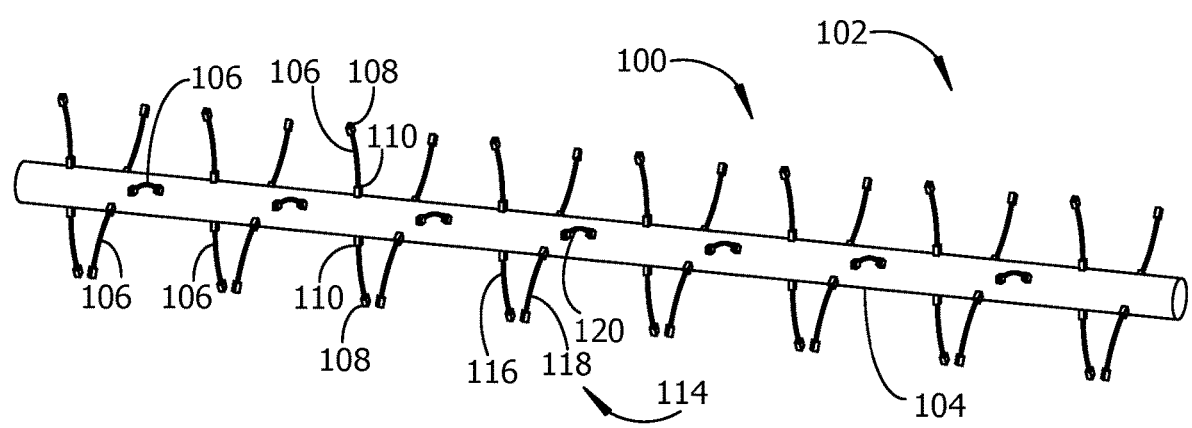
FIG. 2 is a pictorial view of an example embodiment of a shredding rotor included in the destemmer and shredder of FIG. 1 and the axial flow shredder of FIG. 11.
Figure 3:
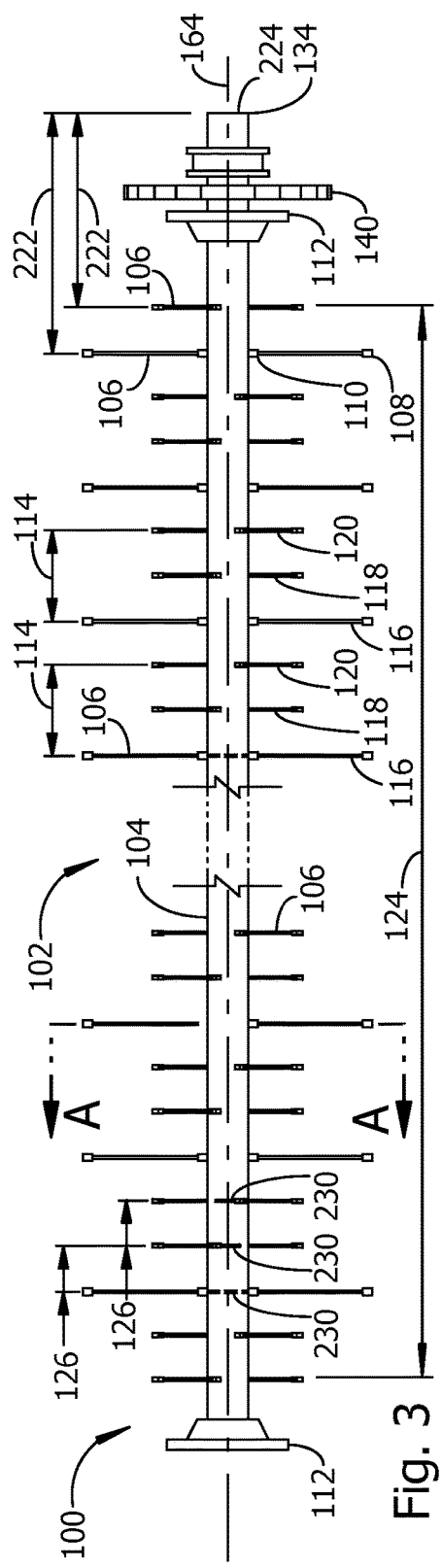
FIG. 3 shows a side view of the example shredding rotor of FIG. 2.
Figure 4:
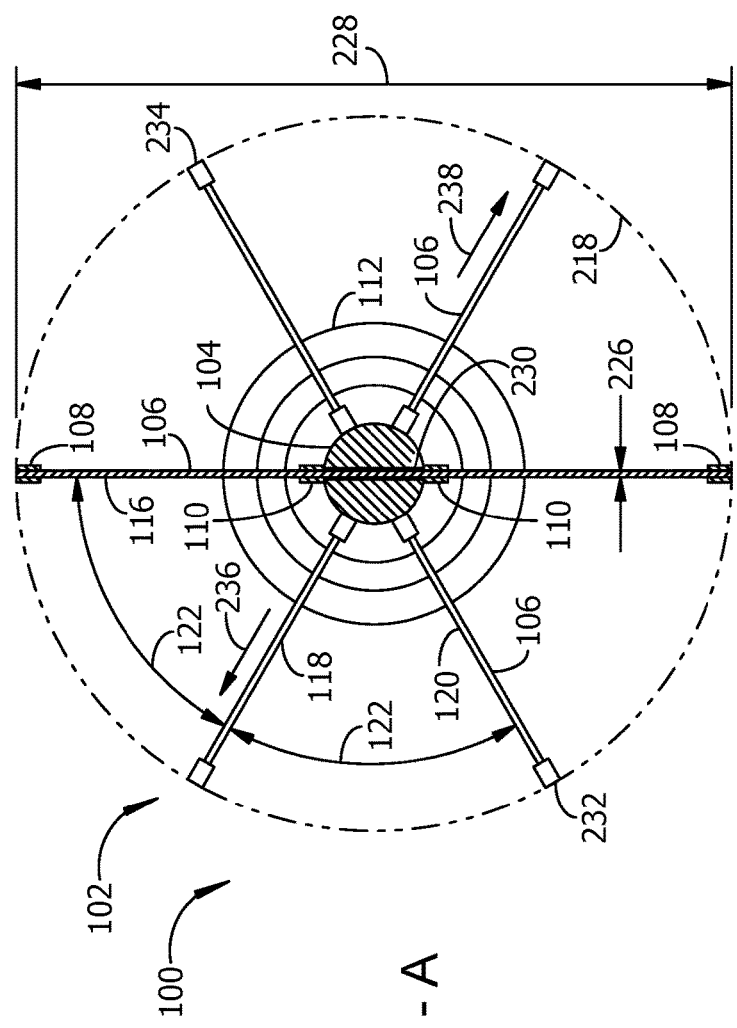
FIG. 4 shows a cross-sectional view A-A view of the example shredding rotor of the previous figures. A location and viewing direction for the cross-sectional view is marked by a section line A-A in FIG. 3.

The shredding rotors are operable to separate hard parts of plant such as stalks or stems from softer parts such as leaves, flowers, and so on. A shredding rotor 102 configured to strip leaves from stems without damaging fibers in the stems is shown in the examples of FIGS. 2-4. As shown in the examples of FIG. 2, FIG. 3, and FIG. 4, an embodiment 100 of a shredding rotor 102 includes a rotor axle 104 having an axis of rotation 164 passing through the center of the rotor axle parallel to the longest dimension of the rotor axle. Axle bearings 112 couple the rotor axle 104 to a stationary support structure, for example to opposite end walls 180 of the support frame 148. A rotor pulley 134 and/or a rotor gear 140 may be attached to the rotor axle 104 for driving the shredding rotor 102 in rotation about the axis of rotation 164.

Many flexible shredding strands 106 extend radially outward from the rotor axle 104. As shown in the example of FIG. 4, each shredding strand 106 preferably passes all the way through a strand through-hole 230 formed in the rotor axle 104 with a shredding strand first end 232 extending outward in a radial direction 236 from the strand through-hole and a shredding strand second end 234 extending outward from the strand through-hole in an opposite radial direction 238. Each shredding strand 106 is preferably provided with its own strand through-hole 230 formed all the way through opposite sides of the shredding rotor and passing through the shredding rotor axis of rotation 164. Strand through-holes 230 are positioned along the rotor axle 104 to establish a separation distance 126 between adjacent shredding strands and a separation angle 122 between adjacent shredding strands. Each shredding strand 106 is preferably attached to the rotor axle sufficiently strongly to prevent the strand from separating from the axle while the shredding rotor is in use. In some example embodiments 100, a shredding strand 106 is retained on the rotor axle 104 by two retaining sleeves 110 crimped onto the shredding strand adjacent opposite ends of the strand through-hole 230. Alternatively, a shredding strand 106 may be retained on the rotor axle by a compression fitting, welding, fusing, a clamp, a fastener such as a screw or rivet, or adhesive.

Attaching the shredding strands 106 to the rotor axle 104 with crimped sleeves 110 provides for easy replacement of worn or broken shredding strands. A worn or broken shredding strand may be replaced by removing one of the retaining sleeves and pulling the shredding strand through the aperture for the shredding strand in the rotor axel. A replacement shredding strand can be inserted into the same aperture and retaining sleeves 110 crimped onto the shredding strand 106 to hold the strand in position on the rotor axle. This arrangement differs substantially from previously known cylindrical brushes, which strongly affix many bristles in clusters around a central core, with individual bristles generally not being repairable or replaceable, and often with many bristles inserted into a same aperture in the central core.

FIG. 3 and FIG. 4 illustrate examples of preferred separation distances and angles between adjacent shredding strands. Adjacent shredding strands 106 on the same shredding rotor 102 are preferably separated from one another in a direction parallel to the axis of rotation 164 by a linear separation distance 126. The separation distance 126 is preferably chosen to be small enough that leaves on a plant to be processed will come into contact with at least one shredding strand, but not so close that leaves or leaf fragments become trapped between adjacent shredding strands. For a shredding rotor 102 configured to process industrial hemp, the value of linear separation distance 126 may be in a range from about 0.5 inch (1.3 centimeters) to about 3 inches (7.6 centimeters). In an example embodiment 100 the linear separation distance is about 1 inch (2.5 cenitmeters).

Figure 5:
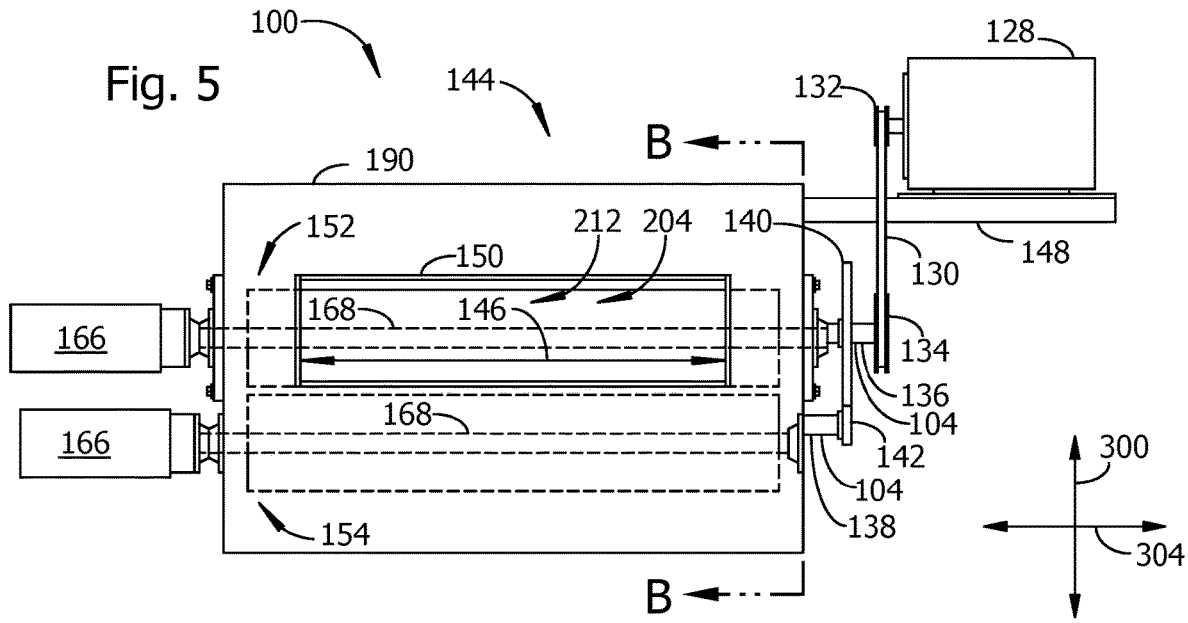
FIG. 5 shows a side view toward an inlet aperture of the example destemmer and shredder of FIG. 1.

Adjacent shredding strands 106 are further arranged with an angular separation 122 as shown in the example of FIG. 4. For a shredding rotor 102 configured to process industrial hemp, the value of angular separation may be in a range from about ten degrees to about ninety degrees. In an example embodiment 100 the angular separation 122 is about sixty degrees. Groups 114 of adjacent shredding strands 106 are repeated over an interval 124 along the rotor axle 104 which each group 114 and the individual shredding strands 106 in each group separated from one another by the selected linear separation distance 126 and the selected angular separation 122. The feed chute 150 is preferably formed with a transverse dimension 146 (ref. FIG. 5) that is smaller than the length of the interval 124 over which shredding strands 106 are attached to the rotor axle 104. As suggested in the example of FIGS. 3-4, for an angular separation 122 of sixty degrees, each group 114 includes a first shredding strand 116, a second shredding strand 118, and a third shredding strand 120. At values of angular separation less than sixty degrees, each group 114 optionally includes more than three shredding strands.

At the distance 222 of each shredding strand 106 from a selected reference point, for example a distance measured from the end of the rotor axle 104, an embodiment 100 of a shredding rotor 102 preferably has only one shredding strand 106 attached to the rotor axle 102. This is a substantially different arrangement than may be found, for example, in cylindrical brushes, which may have multiple bristles attached to one another to form small clusters, and which may have many individual bristles or clusters of bristles extending outward from a central shaft or hub at about the same distance from an end of the central shaft or hub. The greater spacing between shredding strands 106 in a shredding rotor 102 compared to the spacing of bristles in a rotary brush reduces clashing between adjacent shredding strands, reducing wear and reducing the likelihood that plant material will become caught in the shredding rotor compared to a rotary brush, and making the shredding rotor easier to clean than a rotary brush.

Each shredding strand 106 is preferably formed from a flexible material that can withstand many hours of impact with plant materials without breaking, fraying, or substantial erosion from frictional contact and/or chemical attack by plant materials or cleaning agents. Some embodiments 100 use stranded wire rope with a thickness or diameter 226 in a range of about 0.1 inch to about 0.2 inch (2.5 millimeters to 5 millimeters) to make the shredding strands 106. An embodiment 100 may alternately use a woven or monofilament polymer line with a thickness or diameter 226 in a range of about 0.1 inch to about 0.2 inch to make the shredding strands. For a shredding rotor 102 configured for destemming and/or shredding industrial hemp, a length 228 of a fully extended shredding strand 106 may be in a range from about six inches to about 24 inches (15 centimeters to 61 centimeters), i.e., preferably long enough to contact all of the plant material in the input feed stream, but not so long that the outer rotational perimeter 218 of fully extended shredding strands contacts the support frame, support frame cover, or other parts of an embodiment 100.

The thickness dimension 226 of a shredding strand 106 is preferably large enough that leaves are crushed and/or torn rather than cut to enhance disruption of cell walls in the stripped leaves. Enhanced disruption of cells walls in shredded leaves may be beneficial for subsequent material separation procedures such as solvent extraction. A shredding strand 106 with too small a diameter may cut rather than tear, leaving substantial portions of a stripped leaf unaffected. Furthermore, the thickness dimension 226 is preferably small enough that the shredding strands do not break or crush stems and branches into small pieces that may become mixed into the output stream of stripped leaves. Embodiments of a shredding rotor 102 are therefore more effective for separating leaves from stems and branches than devices using blades with sharp edges or rotating flails with hinged metal bars or chains because an embodiment 100 removes fewer and smaller pieces of stems and branches than a blade or rotating flail.

In some embodiments 100, an end cap 108 may optionally be attached to or alternately formed as an integral part of each shredding strand 106. An end cap may be a crimped sleeve or may be molded on, fused, or attached with adhesive. An end cap 108 may tear leaves from stems and/or tear leaves into smaller pieces more quickly than a shredding strand without an end cap. The angular momentum of the end cap 108 may cause the shredding strand 106 to curve around a stem or branch when the shredding rotor 102 spins, resulting in fast and thorough removal of leaves attached to all sides of the stems and branches.

Examples of individual shredding strands 106 in FIG. 4 and elsewhere have been illustrated with the strands at their full extended length 228. However, when the shredding rotor 102 is rotated by the rotor motor 128 and the shredding strands contact plant material, the flexible shredding strands may assume an arcuate shape as suggested in the example of FIG. 10, and may bend around a branch or stem. When a shredding rotor is at rest, the preferred flexibility of the shredding strands allows each shredding strand to deflect under the influence of gravity into a curved or curled profile.

Additional details of the example destemmer and shredder 144 appear in FIGS. 5-10. In FIG. 5, part of the roller of the floating feed roller assembly 152 is visible through the inlet aperture 212 formed in the support frame 148 at an end of the feed chute 150. The floating feed roller assembly 152 includes a roller axle 168 driven in rotation about a roller axis of rotation 169 by a roller motor 166. The fixed feed roller assembly 154 positioned adjacent and below the floating feed roller assembly 152 includes another roller axle 168 driven in rotation about its roller axis of rotation 169 by a second roller motor 166.

FIG. 5 further illustrates an example of a driving mechanism for the shredding rotors in the example destemmer and shredder 144. The rotor axle 104 of the first shredding rotor 136 includes an attached rotor pulley 134 coupled to a motor pulley 132 by the rotor belt 130. The motor pulley 132 is attached to the drive shaft of the rotor motor 128. The rotor motor 128 is strongly attached to the stationary support frame 148. A first rotor gear 140 attached to the first shredding rotor 136 engages a corresponding second rotor gear 142 attached to the second shredding rotor 138. Activating the rotor motor 128 synchronously rotates the first 136 and second 138 shredding rotors. The first and second rotor gears may be selected to turn the first and second shredding rotors at a same rate of rotation or alternately may be arranged to turn the two shredding rotors at different rates of rotation.

Figure 6:
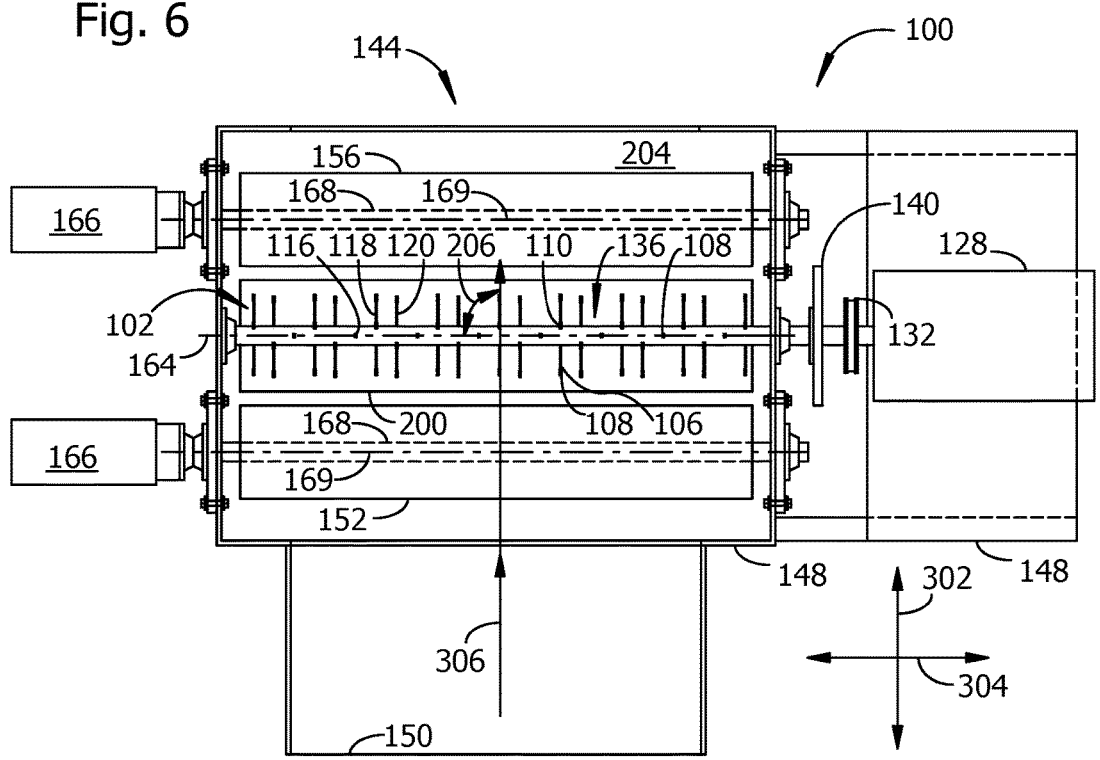
FIG. 6 shows an example of some internal components of the destemmer and shredder of FIGS. 1 and 5 in a view toward the top side of the support frame, shredding rotors, and floating roller assemblies, with the example support frame cover visible in FIG. 1 and FIG. 5 removed in FIG. 6.

A view downward into the interior of the destemming and shredding chamber 204 inside the support frame 148 is shown in FIG. 6. In the example of FIG. 6, the first shredding rotor 136 is interposed between the floating feed roller assembly 152 and the floating output roller assembly 156. The shredding rotors and roller assemblies extend in a lateral direction 304 across the destemming and shredding chamber 204. The shredded material outlet 200, an aperture formed through the bottom side of the support frame 148, is positioned directly underneath the shredding rotors so that plant material removed from stems may fall through the outlet 200 under the influence of gravity.

As suggested in the example of FIG. 6, the direction of travel 306 for plants being pulled through the inlet aperture 212 by the counter-rotating fixed and floating feed roller assemblies is at a substantial path angle 206 relative to the axis of rotation 164 for the shredding rotors 102. The path angle 206 is preferably in a range from about 45° to about 135° measured from the axis of rotation 164 to the direction of travel 306. For some examples of a shredder and destemmer 144, the path angle 206 is approximately 90°. The path angle 206 for the example destemmer and shredder 144 is substantially different from alternative embodiments 100 having the direction of travel 306 approximately parallel to the axis of rotation of a shredding rotor, as will be discussed in more detail with regard to FIGS. 11-15.

In the example destemmer and shredder 144 shown in FIG. 5 and FIG. 6, the rotor motor 128 is attached to the support frame 148 on a laterally opposite side from the roller motors 166. The rotor motor 128, pulleys (132, 134), and gears (140, 142) may alternatively be attached to the support frame 148 of the destemmer and shredder 144 on the same side of the support frame as the roller motors 166.

Figure 7:
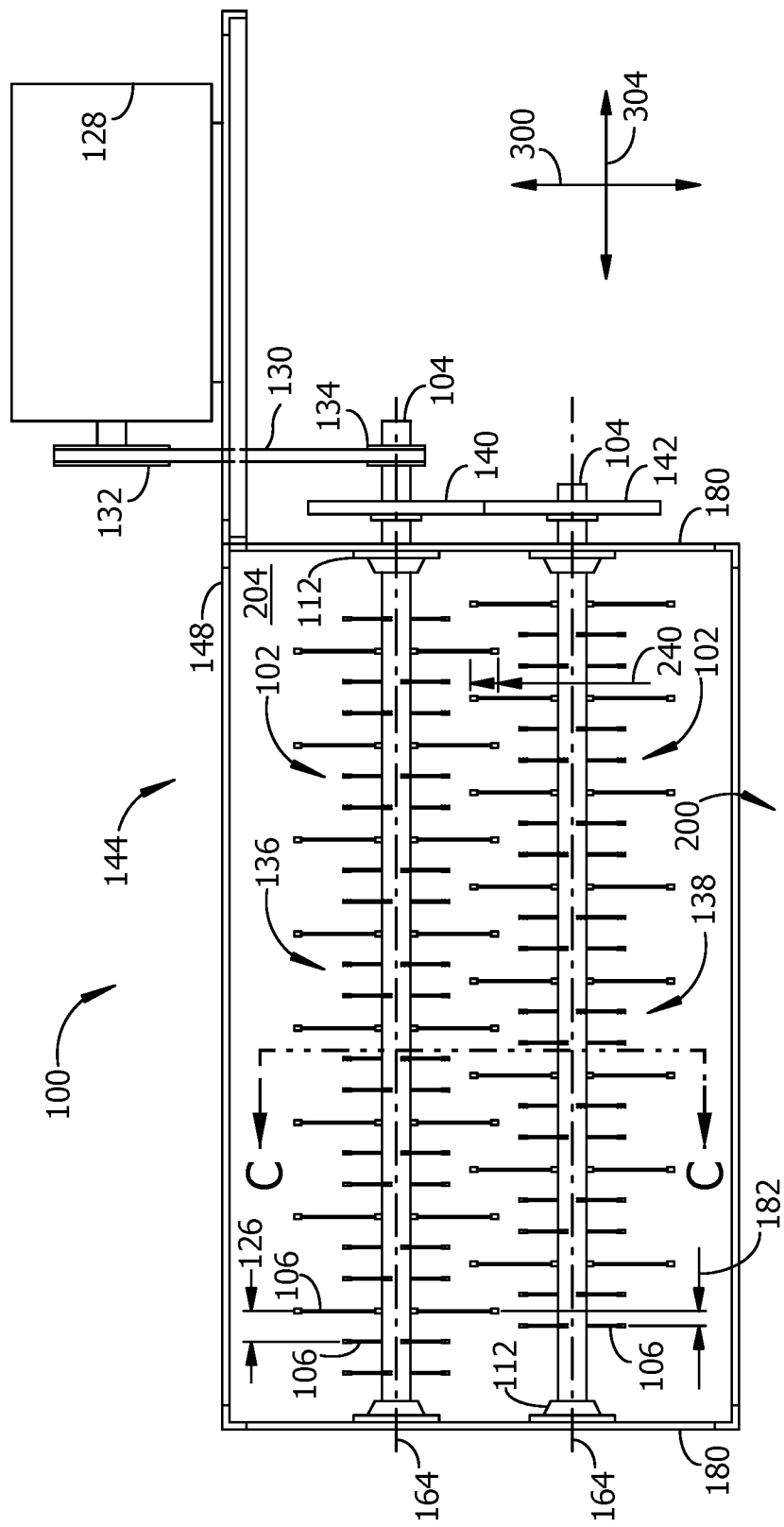
FIG. 7 shows a side view of the example destemmer and shredder of FIGS. 1 and 5 with the support frame cover removed and with an example of two of the shredding rotors of FIGS. 2-4 rotatably coupled to the support frame, and further illustrating an example of opposing shredding strands from the two shredding rotors interleaved with one another.

Some additional features of the shredding rotors 102 are shown in the example of FIG. 7, which shows a view toward the side of the destemming and shredding chamber 204 with the support frame cover 190 removed from the support frame 148. Individual shredding strands 106 on the first shredding rotor 136 are offset in a lateral direction 304 by a linear offset distance 182 from shredding strands 106 on the second shredding rotor 138, causing the shredding strands of one of the shredding rotors to be interleaved with the shredding strands of the opposing shredding rotor. The linear offset distance 182 is preferably about half the linear separation distance 126 between adjacent shredding strands 106 on one rotor axle 104. Furthermore, the interleaved strands 106 overlap by a distance 240 when opposing strands on the two rotor assemblies are fully extended. The angular separation 122 and linear separation 126 are selected to prevent the shredding strands on one of the shredding rotors from clashing against shredding strands on the other shredding rotor throughout full revolutions of the shredding rotors.

Figure 8:
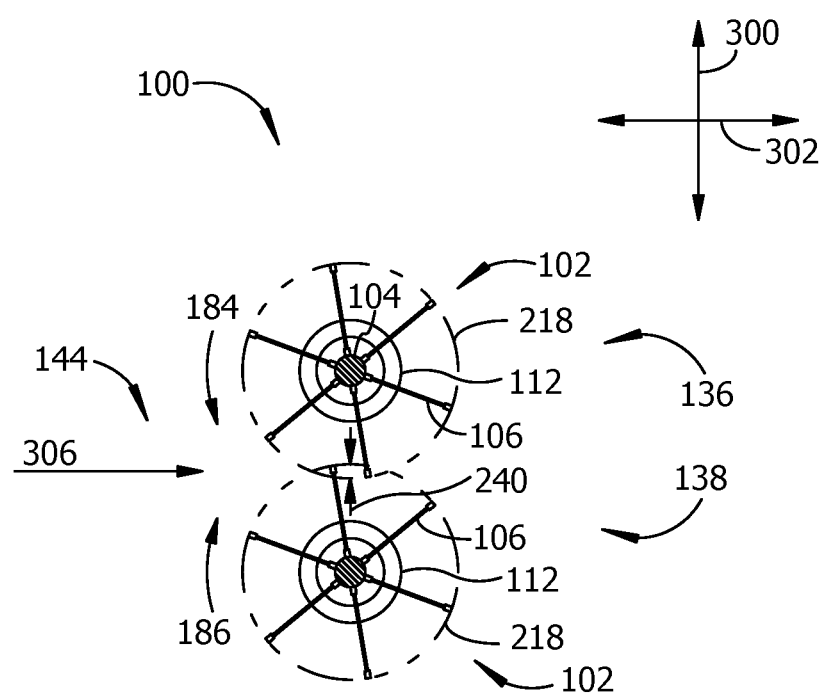
FIG. 8 is a cross-sectional view C-C showing some features of the two interleaved and overlapping shredding rotors from the example of FIG. 7. A location and viewing direction for the cross-sectional view is marked with a section line C-C in FIG. 7.

FIG. 8 shows an example of the first shredding rotor direction of rotation 184 opposite to the second shredding rotor direction of rotation 186. The overlapping and interleaved shredding strands on opposing shredding rotors increase shear forces applied to plant material while reducing breakage and wear from collisions between shredding strands. As suggested in the examples of shredding strands on the two shredding rotors interleaved with one another in FIG. 7 and the overlapping outer rotational perimeters 218 of the shredding strands on the two shredding rotors 102 in FIG. 8, the shredding strands one of the shredding rotors are optionally long enough to collide with opposing shredding strands on the other shredding rotor. The linear offset distance 182 between opposing shredding strands reduces collisions between shredding strands, reducing wear and breakage of the shredding strands and reduces contamination of shredded plant material by strand fragments. An example of an amount of overlap 240 between the outer rotational perimeters is shown in FIG. 8. The value of overlap 240 is preferably in a range from about five percent (5%) of an overall length 228 of a shredding strand 106 to about eighty percent (80%) of the overall length of a shredding strand. Some examples of a shredder and destemmer 144 have an amount of overlap of about twenty percent (20%) for fully-extended opposing shredding strands 106.

Embodiments of a destemmer and shredder 144 are configured to remove leaves from stems, leaving essentially intact stems, and shred the leaves into leaf fragments, and output stripped stems and shredded leaves as two separate streams. Each output stream from the destemmer and shredder 144 moves out of the apparatus embodiment 100 in a direction approximately perpendicular to the rotation axes 164 of the two shredding rotors 102. For an apparatus embodiment 100 operated to process industrial hemp plants, one of the output streams includes a high fraction of stems and branches with a very low fraction (e.g., less than 5% and preferably less than 1% by weight) of other plant materials such as leaves, flowers, and seeds. The other output stream includes a high fraction of shredded leaf fragments, and possibly flowers and seeds, with a low fraction (e.g., less than 5% and preferably less than 1% by weight) of fragments of stems and branches.

Unlike the disclosed embodiments 100 of a destemmer and shredder 144, previously known devices using two opposing rotating cylindrical brushes to destem and shred plant material may have frequent collisions between opposing bristles on the two brushes, possibly leading to a high rate of bristle wear and contamination of processed plant material with broken bristles. Furthermore, opposing cylindrical brushes may drive shredded plant material deeply into the gaps between closely spaced bristles on the brushes, causing the brushes to foul with leaf fragments and plant resins. Fouled brushes reduce the quality of processed plant material, cause a decrease in the rate of processing, and require more frequent maintenance than the disclosed embodiments 100. The preferred interleaved and overlapping arrangement of flexible shredding strands 106 on the opposing shredding rotors in the disclosed embodiments 100 avoid the wear and fouling problems encountered with closely-packed bristles on rotating cylindrical brushes.

Figure 9:
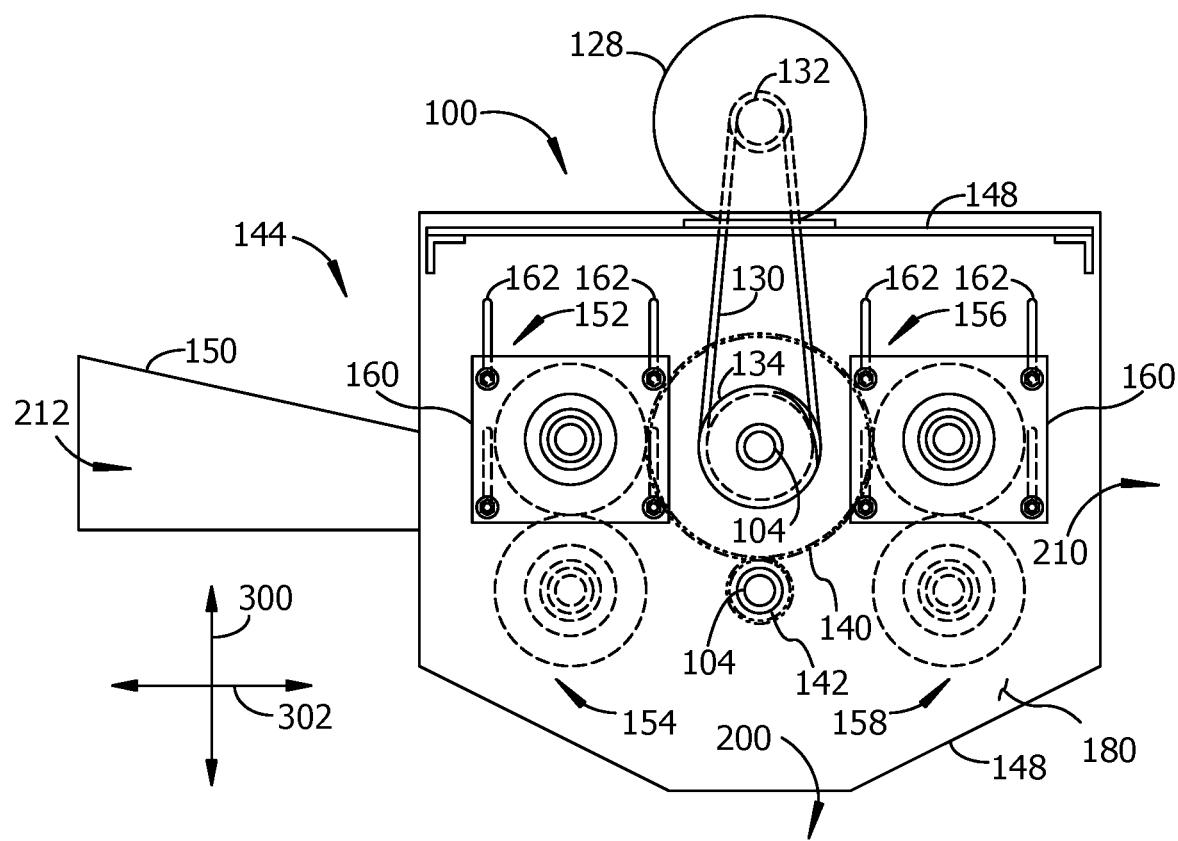
FIG. 9 is a side view of the support frame showing an example arrangement of two shredding rotors and other components included with some embodiments of the destemmer and shredder of FIGS. 1, 5, 6, and 7.
Figure 10:
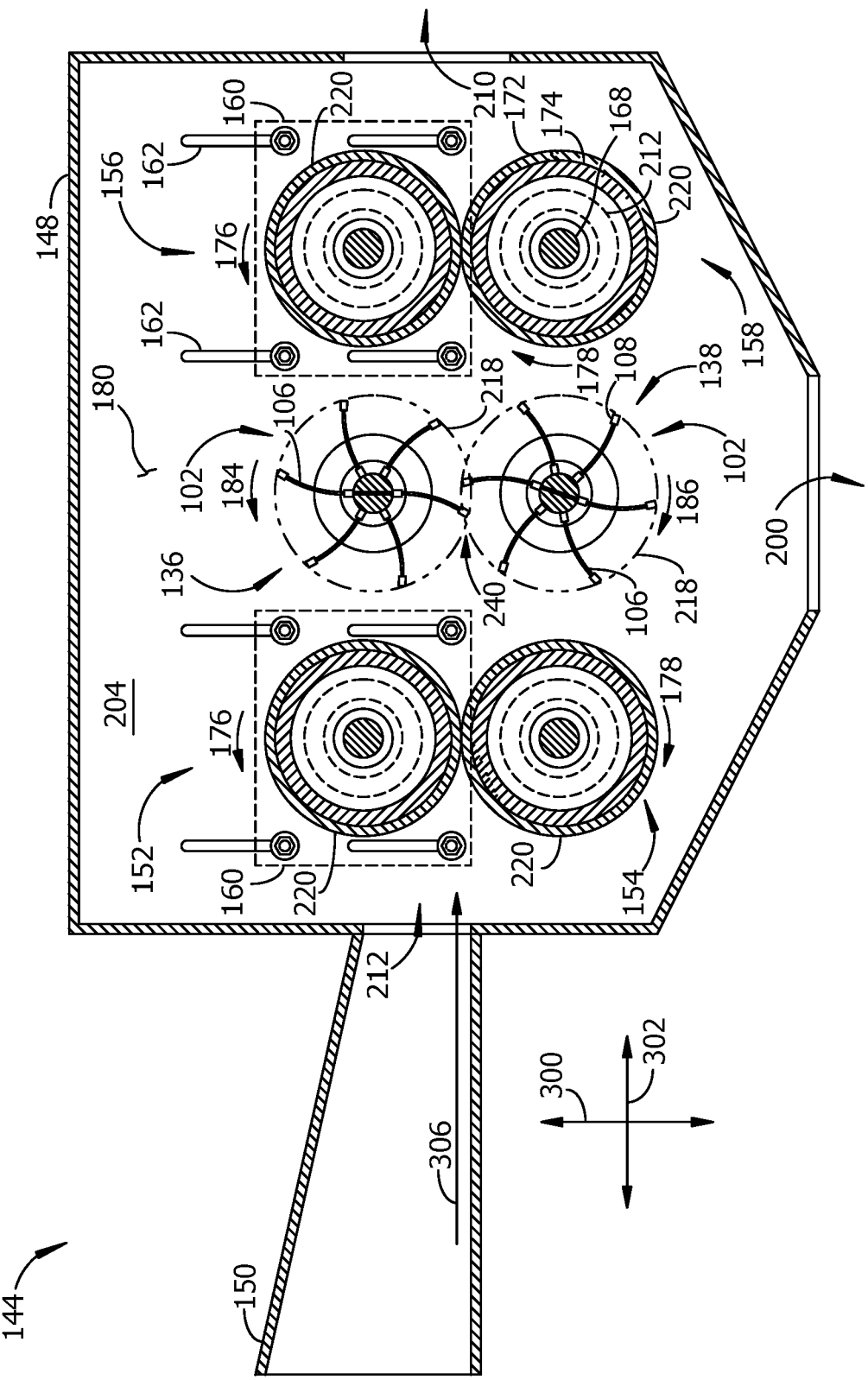
FIG. 10 shows a cross-sectional view B-B illustrating some details of components inside a destemming and shredding chamber for the example destemmer and shredder of the previous figures. A location and viewing direction for the cross-sectional view is marked with a section line B-B in FIG. 5.
Figure 13:
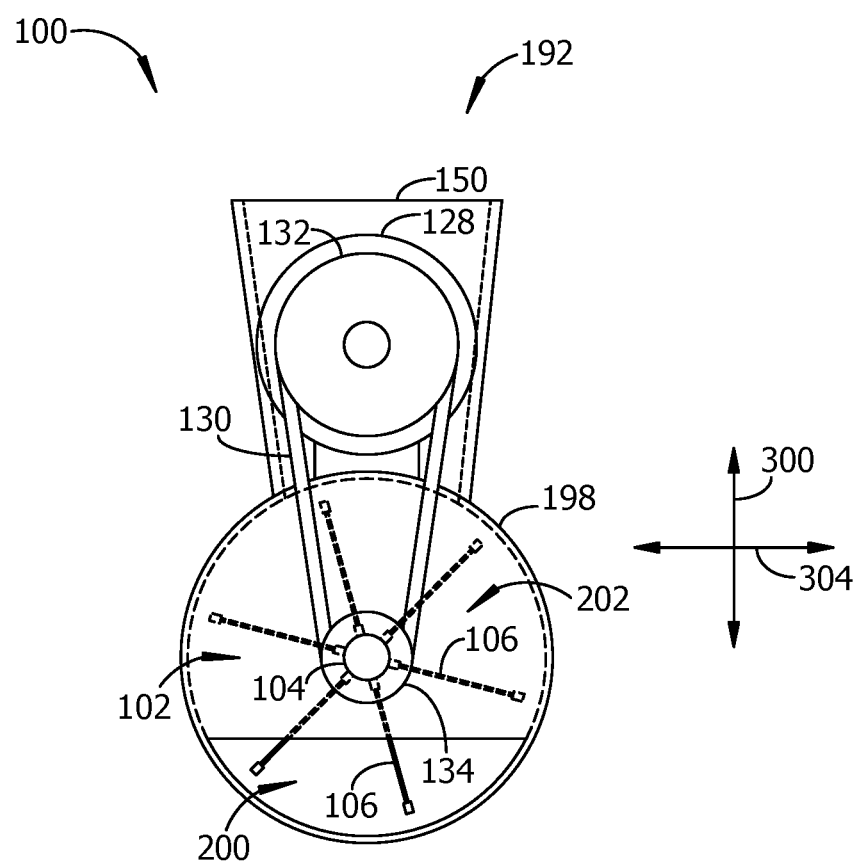

FIG. 9 and FIG. 10 present additional details for the arrangement of roller assemblies and shredding rotors in the example destemmer and shredder 144 of the previous figures. Plant material entering the feed chute 150 passes through the inlet aperture 212 in a longitudinal direction 302 into the destemming and shredding chamber 204. The floating feed roller assembly 152 moves in a vertical direction 300 to admit the plant material into a gap formed between the floating feed roller assembly 152 and the fixed feed roller assembly 154. The cylindrical roller 220 of the floating feed roller assembly 152 turns in a first direction of rotation 176 opposite to the direction of rotation 178 for the cylindrical roller 220 in the fixed feed roller assembly 154. The counter-rotating rollers force the incoming plant material into contact with the counter-rotating first 136 and second 138 shredding rotors, the first shredding rotor 136 rotating in a first direction of rotation 184 and the second shredding rotor 138 rotating in an opposite direction 186. Leaves stripped from the incoming stems fall downward through the shredded material outlet 200. Stems stripped of essentially all leaves but otherwise intact advance toward the counterrotating floating output roller assembly 156 and fixed output roller assembly 158. Stems stripped of leaves are ejected out of the destemming and shredding chamber 204 through an outlet aperture 210 on a side of the support frame 148 opposite the inlet aperture 212.

FIG. 10 further illustrates features of cylindrical rollers 220 used in some disclosed embodiments 100. Each cylindrical roller 220 attaches to an associated roller axle 168. Axle bearings 112 couple the rotor axles to the end walls 180 of the support frame 148. Each cylindrical roller 220 may include a polymer outer layer 172 over a cylindrical metal core 174. The polymer outer layer 172 preferably has a higher coefficient of friction with plant material to be processed than the material of the metal core, enabling the roller assemblies to efficiently transport plant stems and branches through destemming and shredding chamber 204.

In an alternative embodiment 100, a shredding rotor 102 may be configured to transport plant material axially in a bulk flow direction along the shredding rotor, i.e. parallel to the rotational axis 164 of the rotor axle 104. An apparatus embodiment 100 having a shredding rotor 102 configured for material transport in a direction 306 approximately parallel to an axis of rotation of the shredding rotor 102 may be referred to as an axial flow shredder 192. An axial flow shredder is effective for reducing previously destemmed leaves into smaller pieces and may be positioned, for example, to receive a continuous feed of destemmed leaves from a destemmer and shredder 144 and produce a continuous output of shredded plant material reduced in size compared to leaves and/or leaf fragments introduced into the axial flow shredder.

Examples of an apparatus embodiment 100 of a shredding rotor 102 configured for operation as an axial feed shredder 192 are shown in FIGS. 11-15. In the illustrated examples of an axial flow shredder 192, a shredding rotor 102, for example the shredding rotor shown in the examples of FIGS. 2-4, is positioned inside a shredding chamber 202 defined by a cylindrical wall 198, a first end wall 180 joined to the cylindrical wall 198 at a feed end of the axial flow shredder 192, and a second end wall 180 joined to the cylindrical wall 198 at an outlet end of the axial flow shredder. The axle bearing 112 at each end of the rotor axle 104 rotationally couples the shredding rotor 102 to the end walls 180. The length 228 of each shredding strand 106 on the shredding rotor 102 may be selected to prevent the shredding strands from striking the interior walls of the shredding chamber 202. The shredding rotor 102 may be driven in rotation by a rotor motor 128, a motor pulley 132 attached to the rotor motor, and a rotor belt 130 coupled to the motor pulley 132 and to a rotor pulley 134 attached to the rotor axle 104. The shredding rotor 102 may alternately be driven by direct connection to the output shaft of a rotor motor.

Destemmed plant material to be reduced in size may be introduced into the cylindrical shredding chamber 202 through an inlet aperture 216 formed in an end wall 180. Plant material may alternatively be introduced into the shredding chamber 202 through an optional inlet aperture 212 formed in the cylindrical wall 198 of the shredding chamber. An optional feed chute 150 guides plant material into the shredding chamber 202. A conveyor (not illustrated) may deposit material in the feed chute to support a continuous flow of processed output material from the axial flow shredder. Processed plant material flows out of an outlet aperture 200 formed in the cylindrical wall 198 and/or through an optional outlet aperture 214 formed in the end wall 180.

The shredding chamber may optionally be tipped at an angle to encourage material being processed to flow out one of the shredded material outlet apertures (200, 214). FIG. 15 shows an example of a support stand 188 having a height-adjustable leg 196 to set a preferred tilt angle 194. Different values of tilt angle may be used to achieve different degrees of shredding by controlling an amount of time leaf fragments remain inside the shredding chamber 202. Leaves and leaf fragments may remain in contact with shredding strands 106 longer at small values of the tilt angle 194, resulting in smaller processed leaf fragments, and may pass more quickly through the shredding chamber at larger values of the tilt angle, resulting in larger processed leaf fragments. Other parameters for controlling the volume per unit time of processed plant material and the size distribution of shredded material output from the axial flow shredder include, but are not limited to, the length 308 and diameter 310 of the shredding chamber 202, the length 228, linear separation 126 and/or angular separation 122 of shredding strands 106, the number of shredding strand groups 114 along the rotor axle 104, and the rotational speed of the rotor axle 104.

Processed plant material will be output continuously from the axial flow shredder 192 when plant material to be processed is input continuously through an inlet aperture. The axial flow shredder 192 may be coupled to the destemmer and shredder 144 by a conveyor transporting material from the shredded material outlet 200 on the destemmer and shredder 144 to the input inlet aperture 212 on the axial flow shredder 192 for an apparatus embodiment 100 capable of continuous separation of intact plants into separate output streams, one stream comprising a high fraction of stripped branches and stems and a low fraction of leaves or leaf fragments, and the other output stream comprising a high fraction of leaves divided into small pieces and a low fraction of stems and branches.

Unless expressly stated otherwise herein, ordinary terms have their corresponding ordinary meanings within the respective contexts of their presentations, and ordinary terms of art have their corresponding regular meanings.

What is claimed is:
1. An apparatus, comprising:
a support frame;
a shredding rotor rotatably coupled to said support frame, comprising:
  a rotor axle rotatably coupled to said support frame, said rotor axle having a rotor axle axis of rotation parallel to a longest dimension of said rotor axle, and said rotor axle formed with a plurality of strand through-holes;

a shredding strand having a strand first end and a strand second end opposite said first end, said shredding strand formed as an elongate flexible line;

a first of said shredding strand attached to said rotor axle, said first shredding strand passing through a first of said strand through-holes with a strand first end extending radially away from said first strand through-hole and said strand second end extending radially away from said strand through-hole in a direction opposite to said strand first end; and a second of said shredding strand passing through a second of said strand through-holes adjacent said first strand through-hole, said second shredding strand separated from said first shredding strand by a selected linear separation distance and a selected angular separation; and a rotor motor attached to said support frame, said shredding rotor rotatably coupled to said rotor motor.

2. The apparatus of claim 1, further comprising a third of said shredding strand passing through a third of said strand through-holes adjacent said second strand through-hole, said third shredding strand separated from said second shredding strand by said selected linear separation distance and said selected angular separation.

3. The apparatus of claim 2, further comprising:
a shredding strand group comprising said first, second, and third shredding strands; and
a plurality of said shredding strand group attached to said rotor axle with adjacent shredding strand groups separated from one another by said selected linear separation distance.

4. The apparatus of claim 1, wherein said shredding rotor is a first shredding rotor, and further comprising a second of said shredding rotor coupled to said support frame with an outer rotational perimeter of said shredding strands on said first shredding rotor overlapping an outer rotational perimeter of said shredding strands on said second shredding rotor.

5. The apparatus of claim 4, wherein said second shredding rotor is positioned with a selected linear offset distance between one of said shredding strands on said first shredding rotor and an opposing shredding strand on said second shredding rotor.

6. The apparatus of claim 4, further comprising:
an inlet aperture formed in said support frame;
a fixed feed roller assembly attached to said support frame between said inlet aperture and said first and second shredding rotors, an axis of rotation of said fixed feed roller assembly approximately parallel to said rotor axle axis of rotation; and
a floating feed roller assembly slidably engaged with said support frame between said inlet aperture and said first and second shredding rotors and adjacent said fixed feed roller assembly, an axis of rotation of said floating feed roller assembly approximately parallel to said rotor axle axis of rotation.

7. The apparatus of claim 6, further comprising:
an outlet aperture formed in said support frame;
a fixed output roller assembly attached to said support frame between said outlet aperture and said first and second shredding rotors, an axis of rotation of said fixed output roller assembly approximately parallel to said rotor axle axis of rotation; and
a floating output roller assembly slidably engaged with said support frame between said outlet aperture and said first and second shredding rotors and adjacent said fixed output roller assembly, an axis of rotation of said floating output roller assembly approximately parallel to said rotor axle axis of rotation.

8. The apparatus of claim 7, said fixed feed roller assembly further comprising:
a cylindrical roller rotatably coupled to said support frame; and
a roller motor attached to said support frame and rotatably coupled to said cylindrical roller.

9. The apparatus of claim 7, said floating feed roller assembly further comprising:
a first end plate slidably attached to said support frame;
a second end plate slidably attached to a side of said support frame opposite said first end plate;
a cylindrical roller rotatably coupled to said first and second end plates; and
a roller motor attached to said first end plate and rotatably coupled to said cylindrical roller.

10. The apparatus of claim 1, wherein fewer than two of said shredding strand are placed in each of said strand through-holes in said rotor axle.

11. The apparatus of claim 1, wherein said angular separation is in a range from ten degrees (10°) to ninety degrees (90°).

12. The apparatus of claim 11, wherein said angular separation is approximately sixty degrees (60°).

13. The apparatus of claim 1, wherein said linear separation distance is in a range from 0.5 inches (1.3 centimeters) to three inches (7.6 centimeters).

14. The apparatus of claim 1, wherein said support frame is formed with a cylindrical wall enclosing a shredding chamber within and said shredding rotor is rotatably coupled to said support frame with said rotor axle axis of rotation parallel to a length dimension of said shredding chamber.

15. The apparatus of claim 14, wherein said support frame is formed with an inlet aperture near a first end of said rotor axle and an outlet aperture near a second end of said rotor axle opposite said first end.

16. The apparatus of claim 14, further comprising a support stand with a height-adjustable leg, said support stand positioned against said support frame, and said height-adjustable leg configured for adjusting a tilt angle of said support frame.

17. The apparatus of claim 1, wherein a length of said shredding strand is in a range from six inches (fifteen centimeters) to twenty-four inches (sixty-one centimeters).

* * * * *